United States Patent [19]
Fukui et al.

[11] Patent Number: 5,024,306
[45] Date of Patent: Jun. 18, 1991

[54] PROPELLING DRIVE CONTROL APPARATUS FOR WORKING VEHICLE

[75] Inventors: Tetsu Fukui; Takashi Yoshii; Toshihiko Takemura, all of Sakai; Akio Hattori, Minamikawachi, all of Japan

[73] Assignee: Kubota, Ltd., Osaka, Japan

[21] Appl. No.: 272,037

[22] Filed: Nov. 16, 1988

[51] Int. Cl.⁵ .......................................... F16D 25/00
[52] U.S. Cl. ................... 192/3.57; 192/87.15; 192/87.17; 192/109 F
[58] Field of Search ............... 192/87.15, 87.16, 87.17, 192/87.18, 87.19, 109 F, 3.57

[56] References Cited
U.S. PATENT DOCUMENTS

| | | | |
|---|---|---|---|
| 2,861,480 | 11/1958 | Curtis | 192/87.19 |
| 3,541,791 | 11/1970 | Lvovsky et al. | 192/87.15 |
| 3,715,017 | 2/1973 | Jenney | 192/109 F |
| 3,850,273 | 11/1974 | Murakami | 192/109 F |
| 4,093,051 | 6/1978 | Kreitzberg | 192/87.13 |
| 4,293,059 | 10/1981 | Lucas | 192/3.57 |
| 4,560,044 | 12/1985 | Nagata | 192/109 F |
| 4,579,200 | 4/1986 | Murakami et al. | 192/87.19 |
| 4,598,545 | 7/1986 | Harada | 192/87.19 X |

FOREIGN PATENT DOCUMENTS 57-87717  6/1982  Japan .
1409905  10/1975  United Kingdom .

Primary Examiner—Allan D. Herrmann
Assistant Examiner—Andrea Pitts
Attorney, Agent, or Firm—Edwin E. Greigg; Ronald E. Greigg

[57] ABSTRACT

A propelling drive control apparatus for a working vehicle comprising hydraulically operable friction clutches, a first clutch control valve for selecting between the friction clutches, and a second clutch control valve connected in series to the first clutch control valve. The second clutch control valve is manually switchable to a declutching position for disengaging the friction clutches, a first clutch engaging position for engaging one of the friction clutches, and a second clutch engaging position intermediate between the declutching position the first clutch engaging position. In this second clutch engaging position one of the friction clutches is operable under a lower hydraulic pressure than in the first clutch engaging position.

4 Claims, 11 Drawing Sheets (1) 
(2) 
(3)

(1) 
(2) 
(3)

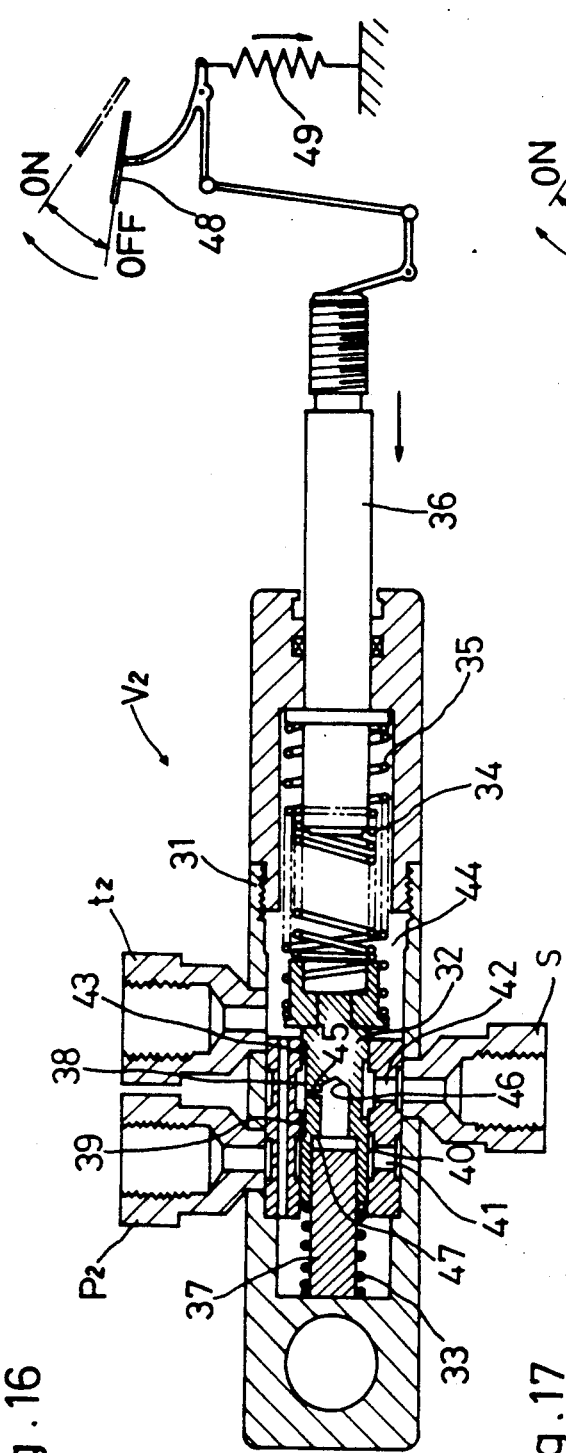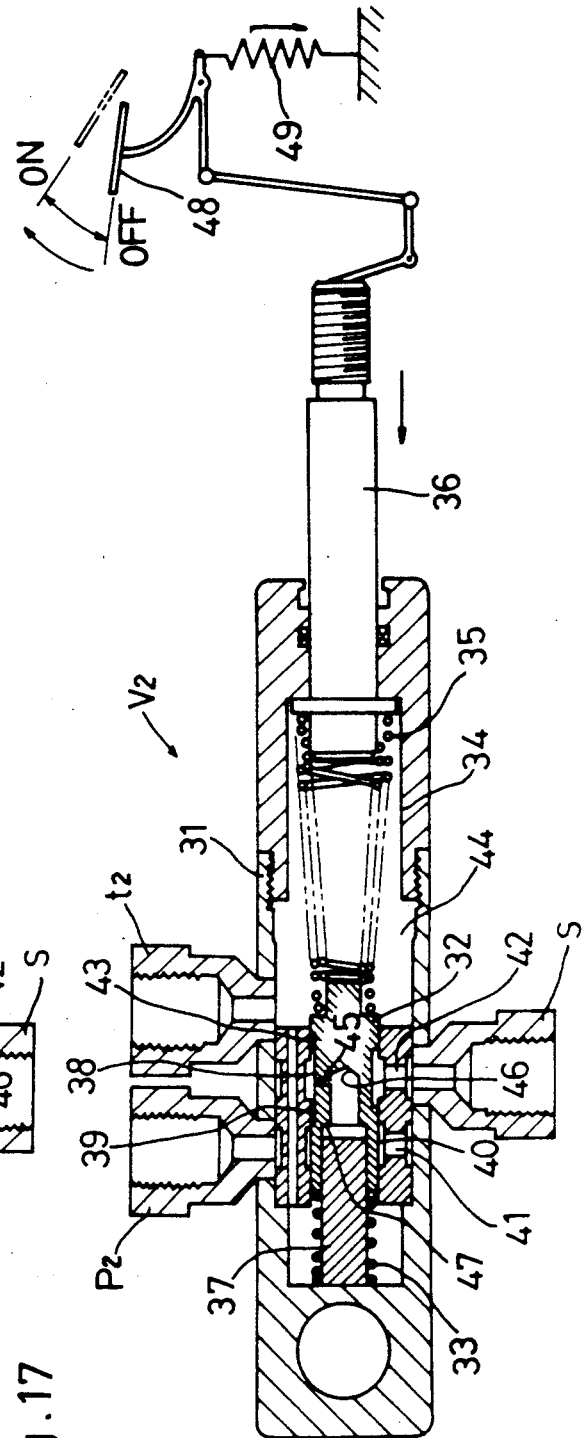
Fig. 16
Fig. 17

PROPELLING DRIVE CONTROL APPARATUS FOR WORKING VEHICLE

BACKGROUND OF THE INVENTION

The present invention relates to propelling drive control apparatus for a working vehicle comprising a hydraulically operable clutch for providing a drive transmission state, and a control valve for controlling the clutch.

In a known working vehicle as noted above, the clutch is operable by the control valve to allow a change speed operation and a backward and forward drive switching operation. Where half-clutch drive and sudden start of the vehicle are desired known working vehicle of this type includes s friction clutch in addition to the hydraulically operable clutch for effecting the change speed operation and the backward and forward drive switching operation, as disclosed in Japanese Patent Publication Kokai No. 57-87717 for example. This friction clutch is operable to provide for the sudden start of the vehicle as well as the half clutch drive for realizing slow start of the vehicle or for pulling the vehicle out of a soft, wet ground.

The known vehicle thus requires the two separate clutches, one operable by the control valve to allow the change speed operation and the backward and forward drive switching operation and the other for realizing the sudden start and the half-clutch drive of the vehicle. This is unsatisfactory from the points of view of construction and cost.

SUMMARY OF THE INVENTION

The object of the present invention is to provide a propelling drive control apparatus which dispenses with the additional clutch for realizing sudden start and half clutch drive of the vehicle.

In order to achieve the above object, a propelling drive control apparatus for a working vehicle according to the present invention comprises hydraulically operable friction clutch means for providing a propelling drive transmission state, first clutch control means for operating the friction clutch means, and second clutch control means connected in series to the first clutch control means and having three control positions, wherein one of the control positions is a declutching position for disengaging the friction clutch means, a second one of the control positions is a first clutch engaging position for engaging the friction clutch means, and the third one of the control positions is a second clutch engaging position intermediate between the declutching position and the first clutch engaging position for engaging the friction clutch means with a lower hydraulic pressure than in the first clutch engaging position.

According to the above construction, when the second clutch control means is placed in the declutching position and then moved quickly from the declutching position to the first clutch engaging position, the hydraulically operable friction clutch means is quickly changed from a disengaged state to a first engaged position without operating the first clutch control means. AT this time, oil pressure upstream of the second clutch control means acts on the friction clutch means at a predetermined maximum level in the first clutch engaging position. The friction clutch means then causes the vehicle to make a sudden start.

When the second clutch control means is switched from the declutching position to the second clutch engaging position and is maintained in the latter position, the friction clutch means is engaged under a lower oil pressure than when the second clutch control means is in the firs clutch engaging position. At this time, the friction clutch means provides a half-clutch state.

The hydraulically operable friction clutch means heretofore is controlled by the first clutch control means to allow a change speed operation and a backward and forward drive switching operation. The second clutch control means provided according to the present invention allows this clutch means to be utilized for sudden start as well as half-clutch drive of the vehicle. The working vehicle equipped with the apparatus according to the present invention, which is simple in construction and inexpensive, is capable of a sudden start useful in thrusting an attached bucket implement into earth and sand during a shoveling operation and of pulling out of a soft, wet ground without help. Further, the clutch means may be operated frequently for fine running adjustment.

In a preferred embodiment of the invention, the friction clutch means comprises a forward drive clutch and a backward drive clutch operable for backward and forward drive switching, and the first clutch control means comprises a valve for selectively engaging the forward drive clutch and the backward drive clutch. According to this construction, the friction clutches for backward and forward drive switching may be used for stopping, suddenly starting or slowly starting the vehicle while maintaining operative states of these clutches.

In a further preferred embodiment, the friction clutch means comprises a friction clutch for deciding whether or not drive having passed a m in change speed device and a backward and forward drive switching device of a propelling drive system should be transmitted to an auxiliary change speed device, and the first clutch control means comprises a control valve for controlling operation of the friction clutch in response to operative states of the change speed devices. This construction, as does the above embodiment, allows the drive transmission to be changed in three ways by operating the friction clutch while maintaining the change speed devices as they are.

Further, a hydraulic circuit for effecting the backward and forward switching operation and the change speed operation generally includes an oil pressure adjusting mechanism for automatically and gradually increasing the clutch operating pressure in order to mitigate shocks of change speed and vehicle starting. With such a hydraulic circuit, because of the presence of the oil pressure adjusting mechanism, the first clutch control means alone is unable to apply a sufficient hydraulic pressure to the friction clutch quickly for starting the vehicle suddenly. According to the present invention, however, the second clutch control means is disposed downstream of the oil pressure adjusting mechanism. This arrangement allows the second clutch control means to be operated while maintaining the oil pressure adjusting mechanism in a position to set the oil pressure to a maximum level, thereby enabling a sudden start of the vehicle effectively.

Other features and advantages of the present invention will be apparent from the following description.

BRIEF DESCRIPTION OF THE DRAWINGS

The drawings illustrate propelling drive control apparatus for a working vehicle embodying the present invention, in which:

FIGS. and 6 are views for illustrating operation of the manual clutch control valve, respectively, FIGS. 10-1 through 10-3 and 11-1 through 11-3 are views for illustrating operation of the valve member shown in FIG. 9, respectively, FIG. 16 shows a manual clutch control valve according to a further embodiment, and FIG. 17 shows a manual clutch control valve according to a still further embodiment.

DETAILED DESCRIPTION OF THE PREFERRED EMBODIMENTS

Figure 1:
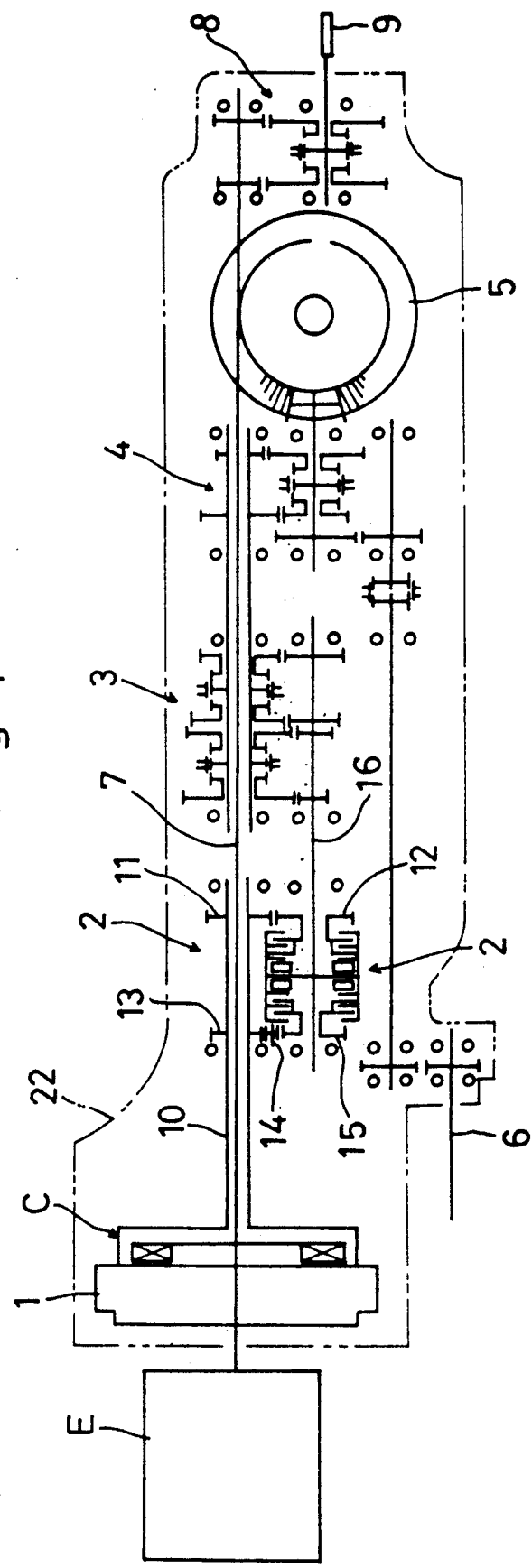
FIG. 1 is a schematic view of a transmission.

Referring to FIG. 1, a transmission structure for an agricultural tractor is shown which comprises a propelling system and a power takeoff system. The propelling system includes a backward and forward drive switching device 2 for receiving torque output of an engine E through a flywheel 1, a main change speed device 3 for receiving torque output of the backward and forward drive switching device 2 and providing four speeds, and an auxiliary change speed device 4 for receiving torque output of the main change speed device and providing two speeds. Torgue output of the auxiliary change speed device 4 is transmitted to a rear differential S and a front wheel drive shaft 6. The power takeoff system includes a transmission shaft 7 for receiving the torque output of the engine E through a clutch C, and a power takeoff change speed device g connected to the transmission shaft 7 for providing two speeds. A power takeoff shaft 9 is connected to the change speed device B.

Figure 2:
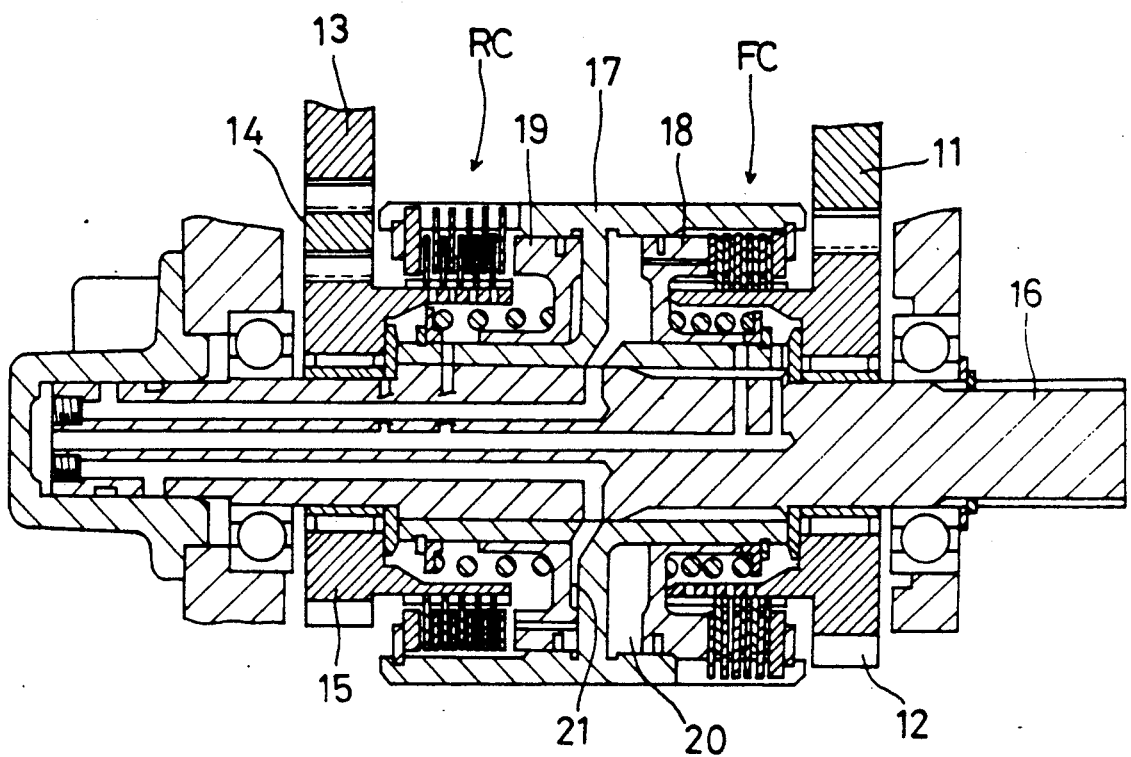
FIG. 2 is a sectional view of a backward and forward drive switching device.
Figure 3:
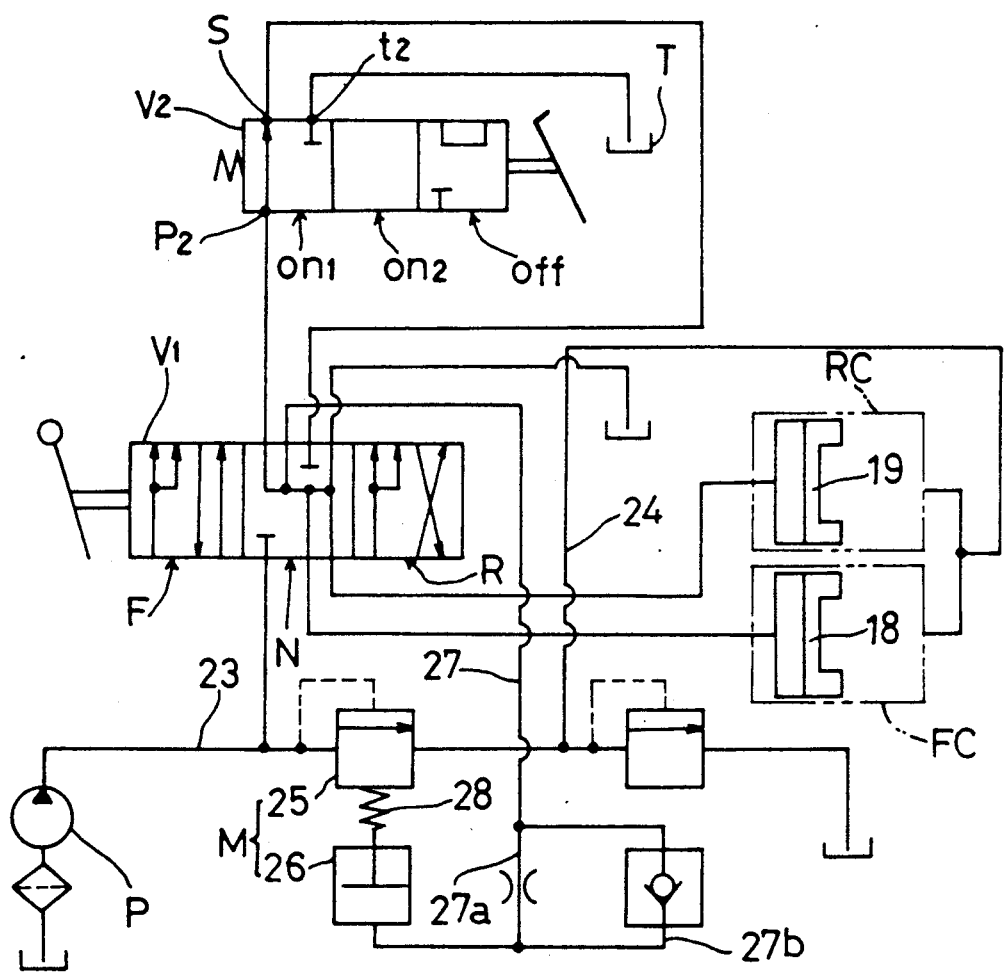
FIG. 3 is a hydraulic circuit diagram.

The backward and forward drive switching device 2 will be described referring to FIGS. 1 and 2. A tubular input shaft 10 carries a first gear 11 and a second gear 13. The backward and forward drive switching device 2 includes an output shaft 16 carrying a forward drive gear 12 and a backward drive gear 15, both rotatable relative to the output shaft 16. The forward drive gear 12 is meshed with the first gear 11, while the backward drive gear 15 is meshed with the second gear 13 through a reversing gear 14. The output shaft 16 further carries a clutch body 17 mounted for rotation with the output shaft 16. The forward drive gear 12 is controllable by a first hydraulic piston 1g provided for a wet, forward drive multidisk friction clutch FC mounted between the clutch body 17 and the forward drive gear 12. The backward drive gear 15 is controllable by a second hydraulic piston 19 provided for a wet, backward drive multidisk friction clutch RC mounted between the clutch body 17 and the backward drive gear 15. The clutch body 17 defines a pair of piston chambers 20 and 21 housing the first and second pistons 10 and 19, respectively. The piston chambers 20 and 21 are connected to a single backward and forward drive switching valve V1, as shown in FIG. 3, through oil lines defined in the output shaft 16 and a transmission case 22. The drive switching valve V1 supplies pressure oil alternatively to the piston chambers 20 and 21 to actuate the first and second pistons 1g and 19. Thus, the forward and backward drive clutches FC and RC are alternatively engageable.

When the backward and forward drive switching valve V1 engages the forward drive clutch FC and disengages the backward drive clutch RC, the torque of input shaft 10 is transmitted to the output shaft 16 through the gears 11 and 12 and the clutch body 17, thereby driving the tractor forward. When the drive switching valve V1 disengages the forward drive clutch FC and engages the backward drive clutch RC, the torque of input shaft 10 is transmitted to the output shaft 16 through the gears 13, 14 and 15 and the clutch body 17, thereby driving the tractor backward.

The forward and backward drive clutches FC and RC receive pressure oil through a manual clutch control valve V2. A mechanism is provided to gradually increase the pressure of the oil supplied to the clutches FC and RC. This mechanism will be described next with reference to FIG. 3.

The backward and forward drive switching valve V1 is connected to an oil pump P through a connecting oil line 23. The forward and backward drive clutches FC and RC receive lubricating oil through an oil line 24. A relief valve 25 is connected to the connecting oil line 23 for supplying oil to the oil line 24, and a hydraulic cylinder 26 is provided for varying and adjusting a relief pressure of the relief valve 25. The relief valve 25 and hydraulic cylinder 26 constitute an oil pressure adjusting mechanism N for gradually increasing the oil pressure for engaging the forward and backward drive clutches FC and RC to a predetermined high pressure level for enabling torque transmission. A control oil line 27 extends from the hydraulic cylinder 26 to the backward and forward drive switching valve V1, whereby the oil pressure adjusting mechanism M is automatically operable with a switching operation of the drive switching valve V1. When the drive switching valve V1 is moved to a forward position F or a reverse position R, the control oil line 27 is connected to the connecting oil line 23 to allow pressure oil to flow from the oil pump P through a throttle position 27a of the control oil line 27 and gradually into the hydraulic cylinder 26. With a gradual increase in the relief pressure caused by the hydraulic cylinder 26, the relief valve 25 gradually changes from an open state to a throttle state, thereby gradually increasing the pressure of the oil supplied from the oil pump P to the piston chamber 20 or 21. The control oil line 27 is connected to a tank T every time the drive switching valve V1 is switched from the forward position F to the reverse position R or vice versa, passing through a neutral position N. Then the hydraulic cylinder 26 is operable, by the resilient restoring force of a relief pressure setting spring 28 extending between the relief valve 25 and hydraulic cylinder 26, to quickly exhaust the oil through a check valve position 27b of the control oil line 27. As a result, the relief pressure of relief valve 25 returns from a high pressure level for clutch engagement completion time to a predetermined level for clutch engagement starting time.

The manual clutch control valve V2 connected to the backward and forward drive switching valve V1 will be described next. The forward or backward drive clutch FC or RC may be disengaged by operating the control valve V2 while maintaining the drive switching valve V1 in the forward position F or reverse position R. Further, the control valve V2 is operable, in spite of the oil pressure adjusting mechanism M, to quickly engage one of the clutches FC or RC at the high pressure level for torque transmission or at a lower pressure level than this high pressure level. This is possible since the backward and forward drive switching valve V1 is not moved to the neutral position N during the operation of the control valve V2, and therefore the relief valve 25 is maintained to effect the high pressure level for clutch engagement completion time. Thus, drive torque may be transmitted suddenly to propelling devices such as round wheels for starting the tractor suddenly, or half clutch transmission may be provided to drive the tractor out of a soft, wet ground. Further, the forward and backward drive clutches FC and RC are used as clutches for allowing operation of the main and auxiliary change speed devices 3 and 4 of the propelling system.

Figure 4:
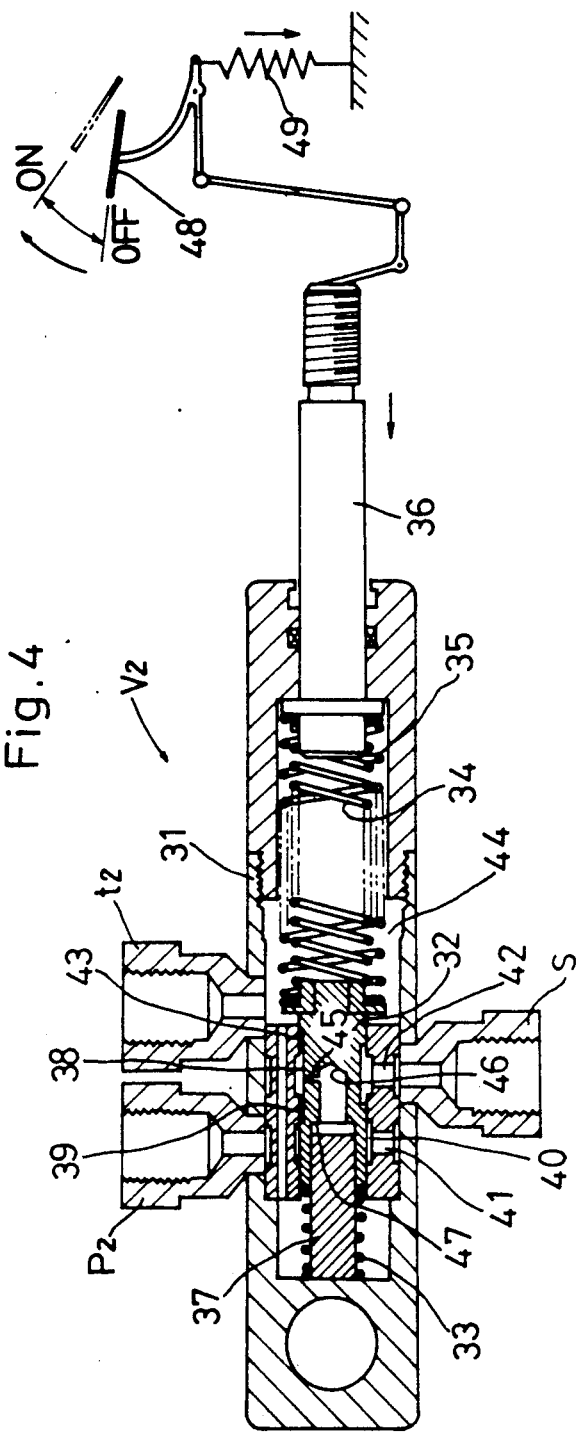
FIG. 4 is a sectional view of a manual clutch control valve.
Figure 6:
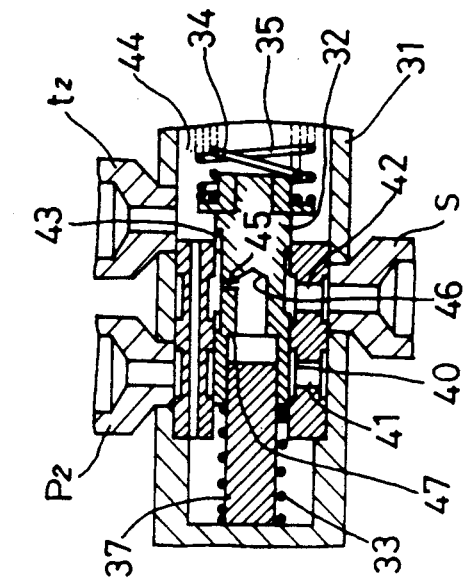
Figure 5:
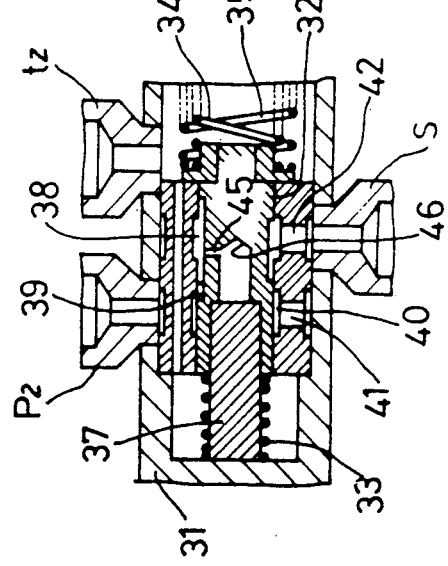
Figure 7:
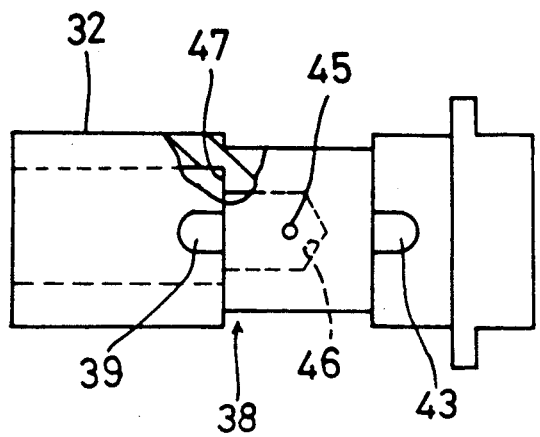
FIG. 7 is a plan view of a valve member.

The manual clutch control valve V2 is constructed as shown in FIG. 4. The control valve V2 comprises a valve member 12 housed in a valve body 31, a first spring 33 acting on one end of the valve member 32, and two second springs 34 and 35 acting on the other end of the valve member S2. A spring bearing shaft S6 extends through one end of the valve body 31 for engaging the ends of second springs S4 and 35 opposite to the ends thereof acting on the valve member 32. The valve member S2 is slidable along a stopper/guide 37 between an oil supplying position shown in FIG. 5 and an oil exhausting position shown in FIG. 6 across a neutral position shown in FIG. 4. In the oil supplying position, a peripheral groove 3g as shown in FIG. 7 communicates with a pump port p2 through a first cutout 39, a valve seat inner peripheral groove 40 and a first valve seat bore 41, and with a cylinder port S through a second valve seat bore 42, thereby connecting the piston chamber 20 or 21 to the backward and forward drive switching valve V1. In the oil exhausting position, the first cutout S9 is displaced from the valve seat inner peripheral groove 40 while the peripheral groove S0 communicates with the cylinder port S, and with a tank port t2 through a second cutout 43 as shown in FIG. 7 and a spring chamber 44, thereby disconnecting the piston chamber 20 or 21 from the drive switching valve V1 and connecting it to the tank T. In the neutral position, the peripheral groove communicates with the cylinder port S while the first cutout 39 is displaced from the valve seat inner peripheral groove 40 and the second cutout 43 from the spring chamber 44, thereby disconnecting the piston chamber 20 or 21 from the drive switching valve V1 and the tank T. The valve member S2 defines Pressure receiving portions 46 and 47 in its interior, which communicate with the peripheral groove 38 through a perforation 45. A back pressure from the piston chamber 20 or 21 acting on the pressure receiving portions 46 and 47, in combination with the first spring 33, urges the valve member 32 toward the oil exhausting position. The second springs 34 and 35 urge the valve member 32 toward the oil supplying position. With an operation of a clutch pedal 4g, the spring bearing shaft 36 is caused to slide under the action of a pedal return spring 49 and second springs S4 and S5, thereby adjusting the urging force of second springs 34 and 35.

More particularly, when the pedal 48 is in an undepressed position ON, the spring bearing shaft 36 is pushed in by the pedal return spring 49 to increase the urging force of second springs 34 and 35 to a maximum level. In this state, the second springs 34 and 35 place the valve member 32 in the oil supplying position until the clutch engaging pressure reaches the predetermined maximum level, thereby allowing of supply from the drive switching valve V1 to the piston chamber 20 or 21. When the clutch engaging pressure reaches the maximum level as a result of this oil supply, the valve member 32 moves to the neutral position shown in FIG. 4 with the oil pressure for driving the hydraulic piston 1g or 19 to the clutch engaging position and the urging force of first spring 33 balancing the urging force of second springs 34 and 35. Consequently, a first clutch engaging position (on1) is established in which the clutch FC or RC is completely engaged. When the pedal 4g is depressed to a limit position OFF, the second springs 34 and 35 push out the spring bearing shaft 36 to its stroke end, whereby the urging force of second springs 34 and 35 is reduced to a minimum level. As a result, the valve member 32 is moved to the oil exhausting position shown in FIG. 6 under the back pressure and the urging force of first spring 33. In this state, the pump port p2 is closed to allow the back pressure to act on the drive switching valve V1 and depressurize the piston chamber 20 or 21. Consequently, a declutching position (off) is established in which clutches FC and RC are disengaged while causing the oil pressure adjusting mechanism N to maintain the maximum pressure level. When the pedal 48 is depressed to an intermediate position between the undepressed position ON and the limit position OFF, the spring bearing shaft 36 is placed in an intermediate position with the depressing force balancing the urging force of second springs 34 and 35. Thereby the urging force of second springs 34 and 35 is adjusted to an intermediate level between the maximum level and the minimum level. The valve member S2 is moved to the oil exhausting position under the back pressure and the urging force of first spring 33, to allow depressurization of the piston chamber 20 or 21. When the back pressure and the urging force of first spring 33 balance the urging force of second springs 34 and 35 as a result of the depressurization, the valve member 32 is moved to the neutral Position to maintain the clutch engaging pressure determined by the adjusted urging force of second springs 34 and 35. Consequently, a second clutch engaging position (on2) is established in which the clutch FC or RC is engaged under an oil pressure lower than the maximum pressure level while causing the oil pressure adjusting mechanism M to maintain the maximum pressure level.

Thus, when the pedal 4B is returned to the undepressed position ON after depressing the pedal 48 to the limit position OFF to disengage the clutches FC and RC, the pressure oil is quickly supplied to the piston chamber 20 or 21 under the maximum pressure provided by the oil pressure adjusting mechanism M. Consequently, the clutch FC or RC is engaged quickly. When the pedal 40 is depressed to the intermediate position short of the limit position OFF, the piston chamber 20 or 21 is slightly depressurized thereby to adjust and maintain the clutch FC or RC in a half-clutch state.

Figure 8:
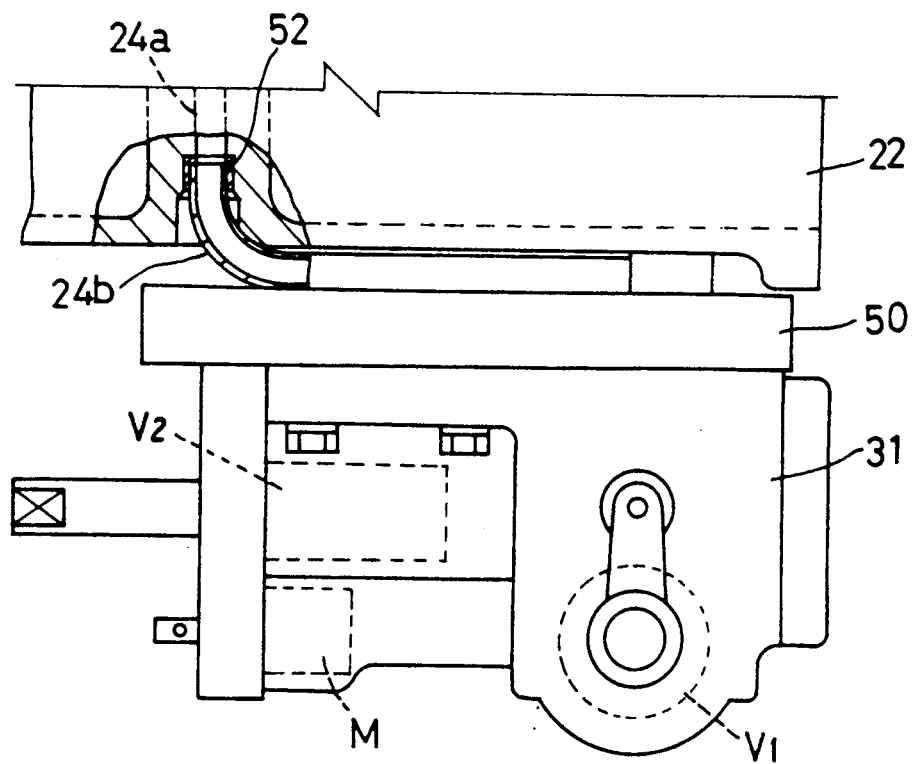
FIG. 8 is a plan view, partly broken away, of a valve mounting structure.

As shown in FIG. 8, the backward and forward drive switching valve V1, the oil pressure adjusting mechanism M and the manual clutch control valve V2 are contained in the single valve body 31 attached to the transmission case 22 which forms part of the tractor body, through an oil line defining plate 50.

Figure 9:
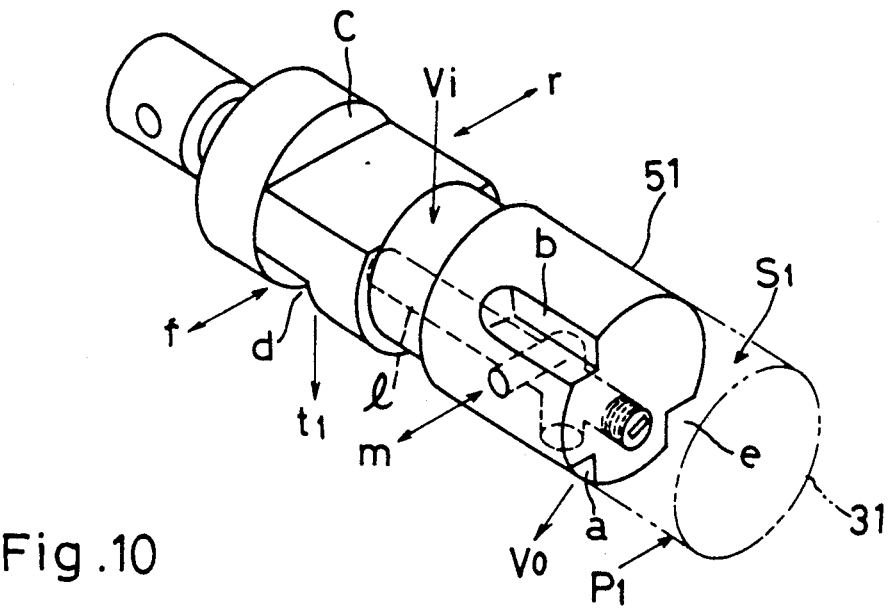
FIG. 9 is a perspective view of a rotary valve member of a drive switching valve.
Figure 10:
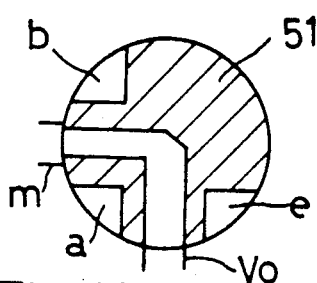
Figure 10:
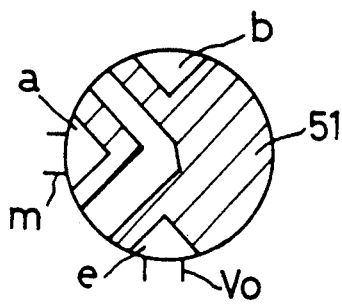
Figure 10:
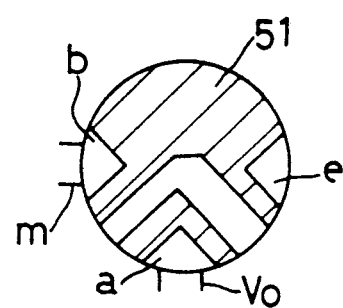
Figure 11:
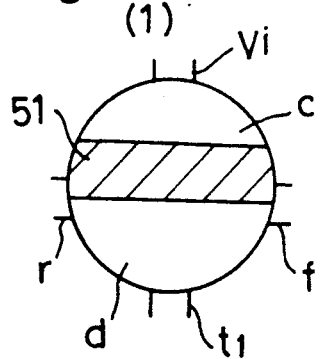
Figure 11:
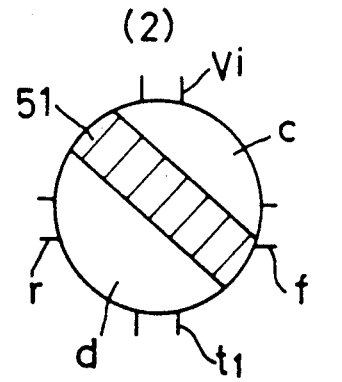
Figure 11:
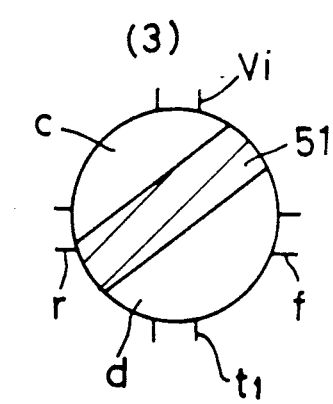

Referring to FIG. 9, the drive switching valve V1 comprises a rotary valve including a rotatable valve member 51. In the forward position F, the pressure oil from the oil pump P is introduced through a pump port Pl into a space Sl defined in the valve body 31 between an end face of the valve member 51 and an inside wall of the valve body 31. The oil is then supplied to the control valve V2 through a first cutout a defined in the valve member 51 as also shown in FIG. 10-1 and an output port VO leading to the control valve V2. The oil is supplied also to the oil pressure adjusting mechanism M through a second cutout b defined in the valve member 51 and an output port m leading to the oil pressure adjusting mechanism H. As shown in FIG. 11-2, the oil is introduced also from the control valve V2 through an input port Vi into a third cutout c defined in the valve member 51, and supplied to the forward drive piston chamber 20 through a forward clutch port f. Further, the backward drive piston chamber 21 is placed in communication with the tank T through a backward clutch port r, a fourth cutout d defined in the valve member 51 and a tank port tl. In the reverse position R, the pressure oil from the oil pump P is introduced through the pump Port Pl into the space Sl. The oil is then supplied to the control valve V2 through a fifth cutout e defined in the valve member 51 as also shown in FIG. 10-2 and the output port V0, and to the oil pressure adjusting mechanism M through the first cutout a and the output port m. As shown in FIG. 11-3, the oil is introduced also from the control valve V2 through the input port Vi into the third cutout c, and supplied to the backward drive piston chamber 21 through the backward clutch port r. Further, the forward drive piston chamber 21 is placed in communication with the tank T through the backward clutch port f, the fourth cutout d and the tank port tl. In the neutral position, as shown in FIGS. 10-1 and 11-1, the oil pressure adjusting mechanism M, the forward drive piston chamber 20 and the backward drive piston chamber 21 are placed in communication with the tank port t1 through the port m, an exhaust passage and the fourth cutout d, through the forward clutch port f and the fourth cutout d and through the backward clutch port r and the fourth cutout d, respectively.

Figure 12:
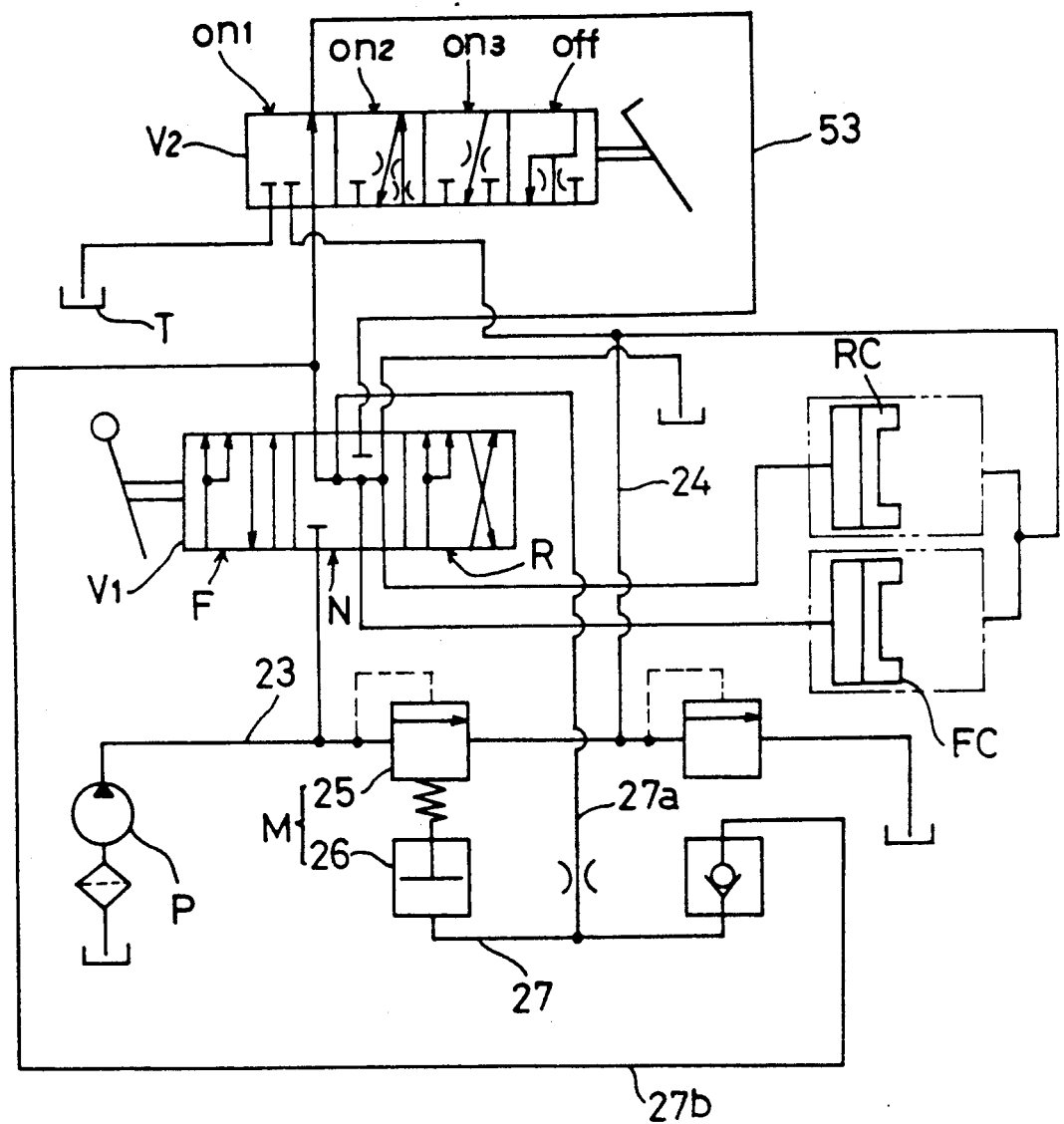
FIG. 12 is a diagram of a modified hydraulic circuit.

FIG. 12 shows the oil pressure adjusting mechanism M and the manual clutch control valve V2 according to a modified embodiment. In this embodiment, the oil pressure adjusting mechanism M is operatively connected to the drive switching valve V1 by separately connecting, to the drive switching valve V1, the throttle position 27a and the check valve position 27b of the control oil line 27 extending from the oil pressure adjusting mechanism M.

When the control valve V2 is operated to the declutching position (off), an oil supply line 53 extending from the drive switching valve V1 is placed in communication with the tank T, thereby disengaging the clutches FC and RC. When the control valve V2 is operated to the first clutch engaging position (onl), the entire oil supply from the drive switching valve V1 is led to the oil supply line 53, thereby placing the clutch FC or RC in the completely engaged position. When the control valve V2 is operated to the second clutch engaging position (on2) or another position (on3), part of the oil supply from the drive switching valve V1 is led to the lubricating oil line 24 and the remaining oil supply to the oil supply line 53, thereby engaging the clutch FC or RC under a lower oil pressure than the maximum pressure level.

A further embodiment of the present invention will be described hereinafter.

Figure 13:
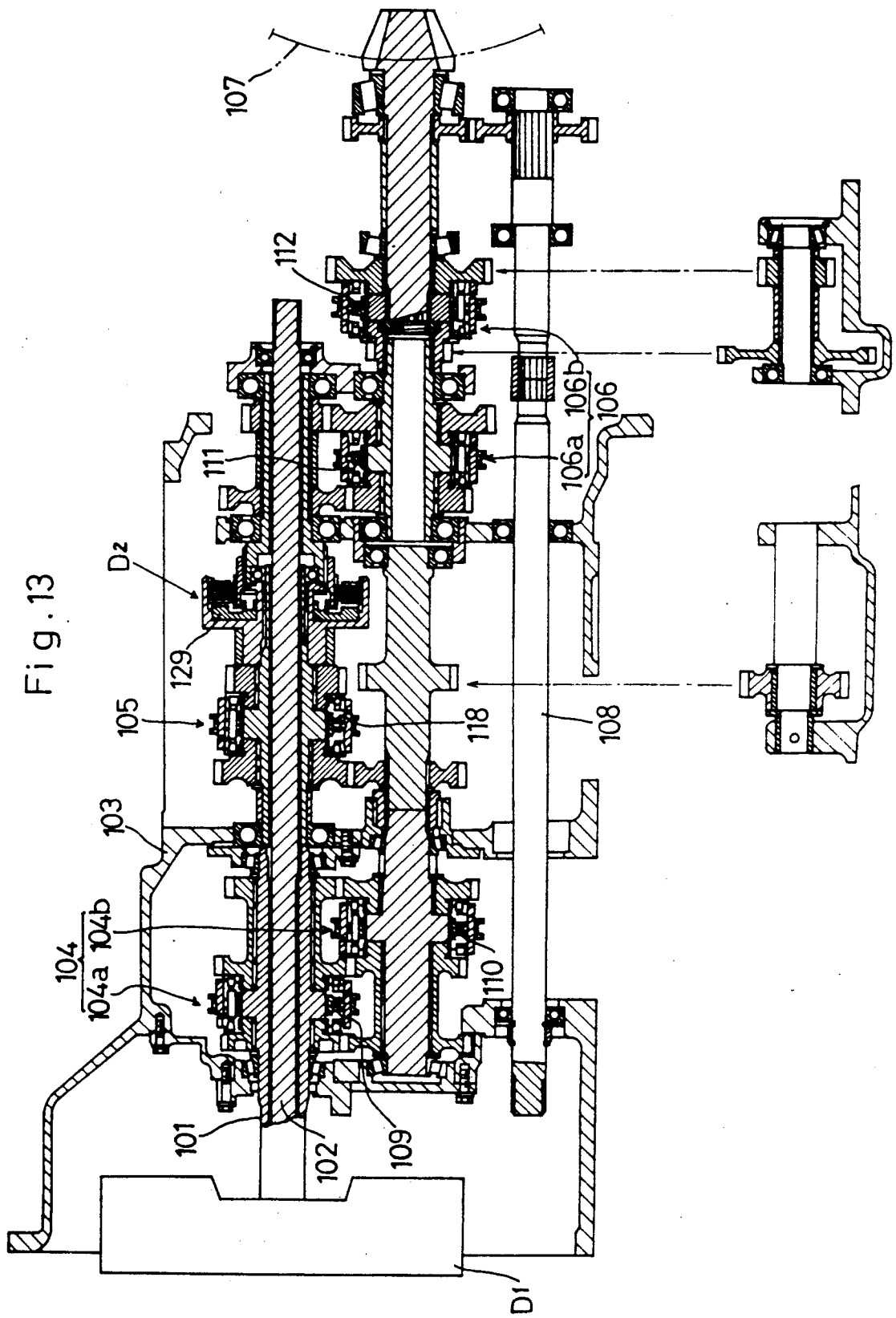
FIG. 13 is a sectional view of a transmission according to a further embodiment.

Referring to FIG. 13, a transmission structure for an agricultural tractor is shown which comprises a propelling system and a power takeoff system. Output of an engine, not shown, is transmitted to a transmission case 10S through a main clutch D1 an outer, input sleeve shaft 101 of the propelling system and an inner input shaft 102 of the power takeoff system. Torque output of the input sleeve shaft 101 is transmitted through a main change speed device 104 to a backward and forward drive switching device 105. Output of the drive switching device 105 is transmitted through a friction clutch D2 to an auxiliary change speed device 106. Torque output of the auxiliary change speed device 106 is transmitted to a rear differential 107 and a front wheel drive shaft 108.

Figure 14:
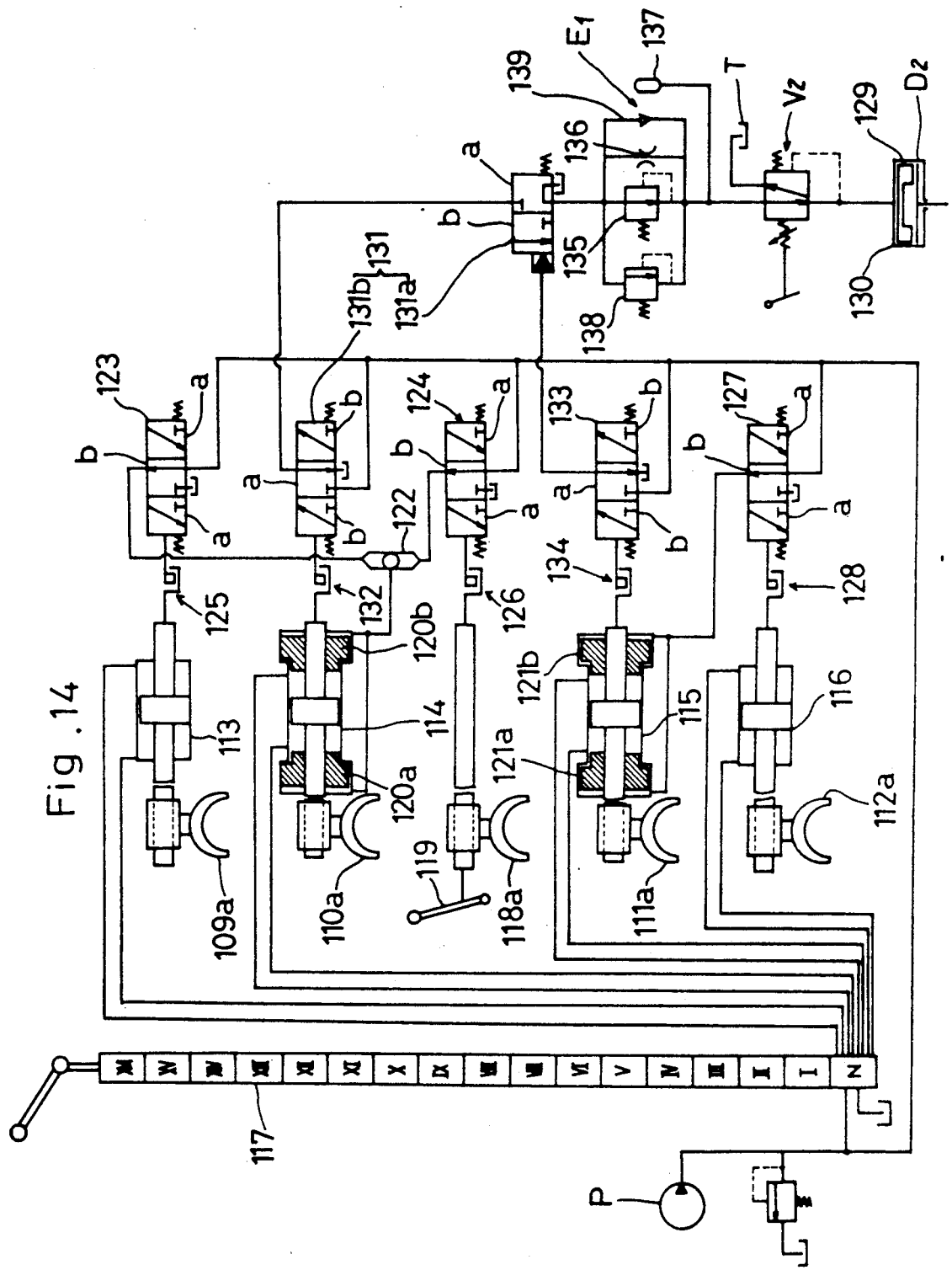
FIG. 14 is a diagram of a hydraulic circuit according to the further embodiment.

Each of the main change speed device 104 and auxiliary change speed device 106 includes two shift gears 109 and 110 or 111 or 112 slidable for providing four speeds. Thus, the entire propelling system provides 16 forward speeds and 16 backward speeds in total. The change speed operation is effected through a control structure as shown in FIG. 14.

One of the shift gears 109 of the main change speed device 104 is switchable by a first hydraulic cylinder 113 through a shift yoke 109a, and the other shift gear 110 by a second hydraulic cylinder 114 through a shift Yoke 110a. One of the shift gears 111 of the auxiliary change speed device 106 is switchable by a third hydraulic cylinder 115 through a shift yoke 111a. and the other shift gear 112 by a fourth hydraulic cylinder 116 through a shift yoke 112a. All of the hydraulic cylinders 113-116 are connected to a single rotary change speed valve 117. The change speed valve 117 has a neutral position N and 16 control positions I-XVI for controlling the hydraulic cylinders 113-116 to place the shift gears 109-112 in engaging or disengaging positions corresponding to the neutral position N or one of the control positions I-XVI.

The backward and forward drive switching device 105 includes a shift gear 110 switchable by a hand lever 119 through a shift yoke 119a.

The second hydraulic cylinder 114 includes a pair of first gear disengaging pistons 120a and 120b, while the third hydraulic cylinder 115 includes a pair of second gear disengaging pistons 121a and 121b. Piston chambers of the first gear disengaging pistons 120a and 120b are connected through an oil line switching valve 122 to two control valves 123 and 124 which are automatically switchable to place the first gear disengaging pistons 120a and 120b in and out of operation. One of the control valves 123 is connected to the first hydraulic cylinder 113 through an interlocking mechanism 125. The other control valve 124 is connected to the hand lever 119 through an interlocking mechanism 126. A control valve 127 for placing the second gear disengaging pistons 121a and 121b in and out of operation is connected to the fourth hydraulic cylinder 116 through an interlocking mechanism 12g. When the first hydraulic cylinder 113 disengages the shift gear 109, the control valve 123 is switched by the first hydraulic cylinder 113 to an operative position b. When the hand lever 119 is operated to disengage the shift gear 110, the control valve 124 is switched to an operative position b. In either case, the first gear disengaging pistons 120a and 120b are driven by pressure oil supplied from an oil pump P. At this time the pressure oil from the same oil pump P acts also on the piston of the second hydraulic cylinder 114. However, since the first gear disengaging pistons 120a and 120b have a larger pressure receiving area than the cylinder piston, the first gear disengaging pistons 120a and 120b place the second hydraulic cylinder 114 in a gear disengaging position, overriding the oil supply from the change speed valve 117. When the first hYdraulic cylinder 113 has completed engagement of the shift gear 109, the control valve 123 switches under a self-restoring force to one of the release positions a. When the operation of the hand lever 119 has completed engagement of the shift gear 110, the control valve 124 switches under a self-restoring force to one of the release positions a. In either case, the first gear disengaging pistons 120a and 120b are placed out of operation to allow the second hydraulic cylinder 114 to move the shift gear 110 into one of the engaging positions. When the fourth hydraulic cylinder 116 disengages the shift gear 112, the control valve 127 is switched to an operative position b because of an interlocking arrangement similar to that between the first hydraulic cylinder 110 and the first gear disengaging pistons 120a and 120b. Then the second gear disengaging pistons 121a and 121b place the third hydraulic cylinder 115 in a gear disengaging position, overriding the oil supply from the change speed valve 117. When the fourth hydraulic cylinder 116 has completed engagement of the shift gear 112, the control valve 127 switches to one of the release positions a whereby the second gear disengaging pistons 121a and 121b allow the third hydraulic cylinder 115 to move the shift gear 111 into one of the engaging positions. Thus, when switching an upstream main change speed section 104a having the shift gear 109, a downstream main change speed section 104b is placed in a non-transmission state automatically and temporarily. Similarly, when switching a downstream auxiliary change speed section 106b having the shift gear 112, an upstream auxiliary change speed section 106a is placed in a non-transmission state automatically and temporarily. When operating the backward and forward drive switching device 105, the downstream main change speed section 104b disposed upstream thereof is placed in a non transmission state.

The clutch D2 is operable by a hydraulic piston 129 mounted in a clutch body. The hydraulic piston 129 is controlled by a control valve unit 131 which consists of a first, two position valve 131a and a second, three position valve 131b connected in series to a piston chamber 130 of the piston 129. The control valve unit 131 assumes a declutching position when at least one of the first and second control valves 131a and 131b is in an oil supply stopping position, and a clutch engaging position when both of the control valves 131a and 131b are in oil supplying positions. The second control valve 131b is connected to the second hydraulic cylinder 114 through an interlocking mechanism 152. The first control valve 131a has a pilot pressure control section connected to a pilot control valve 100 which is connected to the third hydraulic cylinder 115 through an interlocking mechanism 134. Thus, the control valve unit 131 is linked with the hydraulic cylinders 113–116 and the hand lever 119 such that the hydraulic piston 129 is automatically moved to the declutching position with the disengagement of each of the shift gears 109–112 and 118, and to the clutch engaging position with the engagement of each of the shift gears 109–112 and 118. More particularly, when the second hydraulic cylinder 114 disengages the shift gear 110, the second control valve 131b switches under a self-restoring force to an oil supply stopping position a. When the second hydraulic cylinder 114 completes the engagement of the shift gear 110, the second control valve 131b is driven by the second cylinder 114 to one of the oil supplying positions b. When the third hydraulic cylinder 115 disengages the shift gear 111, the pilot control valve 133 switches under a self-restoring force to an oil supply stopping position a and the first control valve 131a also switches under a self-restoring force to an oil supply stopping position a. When the third hydraulic cylinder 114 completes the engagement of the shift gear 111, the pilot control valve 133 is driven by the cylinder 114 to one of the oil supplying positions b and the first control valve 131a switches under a pilot oil pressure to an oil supplying position b. This control valve linkage, combined with the described linkage for automatically placing the downstream main change section 104b and upstream auxiliary change speed section 106a out of operation, causes at least one of the first and second control valves 131a and 131b to move automatically to the oil supply stopping position a when at least one of the shift gears 109–112 and 110 is disengaged. When all of the shift gears 109, 112 and 110 are engaged, both of the first and second control valves 131a and 131b move to the oil supplying positions b, respectively.

An oil pressure adjusting mechanism El is disposed between the control valve unit 131 and the piston chamber 130. The oil pressure adjusting mechanism El includes a low-pass valve 135 through which the pressure oil from the control valve unit 131 flow to be supplied to the piston chamber 130. When the oil pressure in the piston chamber 130 reaches a predetermined low level, the low pass valve 135 is automatically closed by a back pressure from the piston chamber 130. Then the oil is supplied to the piston chamber 130 through a throttle valve 136 while storing pressure in an accumulator 137. When the oil pressure in the piston chamber 130 reaches a predetermined high level, a high-pass valve is automatically opened by the back pressure, through which the oil is supplied to the piston chamber 130. In this way, the clutch engaging pressure of the hydraulic piston 129 is automatically and gradually increased. When the control valve unit 131 is switched to the declutching position, the pressure stored in the accumulator 137 is released through an oil line 139 including a check valve. Thus, the pressure is gradually increased each time the control valve unit 131 is switched from the declutching position to the clutch engaging position.

In other words, the switching operation of the change speed valve 117 causes the first and second hydraulic cylinders 113 and 114 to exert hydraulic power for switching the main change speed device 104 of the propelling system, and the third and fourth hydraulic cylinder 115 and 116 to exert hydraulic power for switching the auxiliary change speed device 106. The operation of the hand lever 119 results in a manual operating force for switching the backward and forward drive switching device 105. The operation of the clutch D2 required for each of these switching operations is effected by hydraulic power of the hydraulic piston 129 automatically and while mitigating change speed or starting chocks acting on the oil pressure adjusting mechanism E1. The upstream main change speed section 104a, the downstream auxiliary change speed section 106b and the backward and forward drive switching device 105 are switched by disengaging the downstream main change speed section 104b and the upstream auxiliary change speed section 106a. Thereby inertia of the rotary elements in the sections not to be switched is prevented from being transmitted to the section to be switched, to facilitate synchronization at the section to be switched.

A manual clutch control valve V2 is disposed between the oil pressure adjusting mechanism E1 and the piston camber 130. This clutch control valve V2 is similar to the clutch control valve described with reference to FIGS. 4 through 6. The clutch control valve V2 is operable by the foot pedal 48 through the interlocking mechanism, to engage the clutch D2 quickly and to adjust the clutch engaging pressure.

Thus, the operation of the clutch control valve V2 similar to the operation in the preceding embodiment engages the clutch D2 with a lower operating pressure than a predetermined maximum level while maintaining the oil pressure adjusting mechanism E1 at the predetermined maximum pressure level.

When the pedal 40 is returned to the undepressed position ON after depressing the pedal 40 to the limit position OFF to disengage the clutch D2, the pressure oil is quickly supplied from the oil pressure adjusting mechanism E1 to the piston chamber 130 thereby quickly engaging the clutch D2. When the pedal 48 is depressed to the intermediate position short of the limit position OFF, the piston chamber 130 is slightly depressurized thereby to adjust the clutch D2 to a half-clutch state or to the second clutch engaging position (on2).

Figure 15:
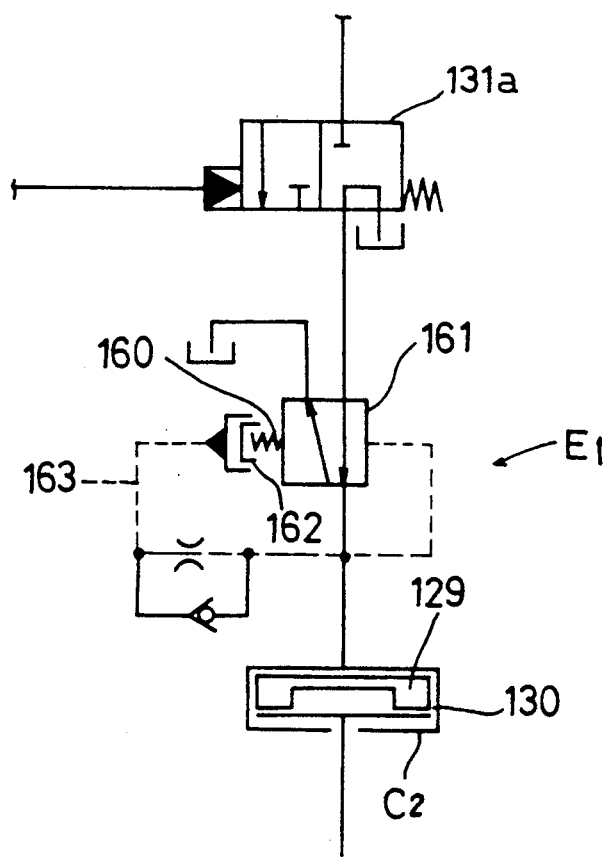
FIG. 15 is a schematic view of a modified oil pressure adjusting mechanism.

FIG. 15 shows a modified oil pressure adjusting mechanism E1. This adjusting mechanism E1 includes a pressure adjusting valve 161 disposed between the piston chamber 130 and the first control valve 131a for setting an oil pressure in the piston chamber 130 based on a balance between the back pressure from the piston chamber 130 and a pressure setting spring 160. The adjusting mechanism E1 further includes a piston 162 for varying the urging force of the pressure setting spring 160, and an oil line 163 connected to the pressure adjusting valve 161 for controlling the piston 162 such that the pressure set by the pressure setting spring 161 increases with oil supply to the piston chamber 130.

The present invention may be practiced otherwise than the two described embodiments. For example, the invention may be used for selectively engaging two or more friction clutches or for selectively providing one of a plurality of speeds.

The first spring 33 provided in the manual clutch control valve produces the effect of smoothing the sliding movement of the valve member 32. However, only the back pressure may be used for urging the valve member 32 to the oil exhausting position.

Also in the previous embodiment, the second springs 34 and 35 are of springs of the same length and different diameters which urging forces linearly vary in accordance with the operational amount of the valves. In place of this, as shown in FIG. 16, these second springs 34 and 35 may be formed as a double-coil spring structure which load is small at the initial stage and becomes larger after the operating amount has exceeded a predetermined value. Similarly, for achieving he same effect of non-linear response characteristics, the second springs 34 and 35 may be formed as a conical coil spring type as well as shown on FIG. 17.

In the second embodiment, the pressure adjusting mechanism El and the clutch control valve V2 may be integrated into a single valve construction.

Further, the clutch control valve V2 may be arranged operable through a hand lever instead of the foot pedal 48.

The present invention is applicable also to other types of working vehicles than the described agricultural tractor, such as transport vehicles.

What is claimed is:

1. A propelling drive control apparatus for a working vehicle comprising:

a pump for supplying hydraulic oil to said apparatus, hydraulically operable friction clutch means for providing a propelling drive transmission state, first clutch control means for operating said friction clutch means, second clutch control means connected in series to said first clutch control means and having three control positions (off, onl and on 2), wherein one of said control positions is a declutching position (off) which is established for stopping a hydraulic oil supply to said friction clutch means and for releasing hydraulic pressure oil from said friction clutch means, a second one of said control positions is a first clutch engaging position (onl) which is for supplying pressure oil supplied to said second clutch control means directly to said friction clutch means, and the third one of said control positions is a second clutch engaging position (on 2) which is for stopping the hydraulic oil supply from said second clutch control means to said friction clutch means, means for releasing the hydraulic pressure oil from inside said friction clutch means in an amount corresponding to an amount of operation of a control device, and thereafter stopping release of the hydraulic pressure oil to maintain an oil pressure in said friction clutch means, and an oil pressure adjusting mechanism including a variable relief valve and an adjusting means mounted in an oil feed passage from said pump for the first and second clutch control means, said oil pressure adjusting mechanism being connected to the oil feed passage with the first clutch control means being in an operative position whereby relief pressure of the relief valve increases with increasing oil pressure supplied to the oil pressure adjusting mechanism, said oil pressure adjusting mechanism being connected to a return tank with the first clutch control means being in a neutral position whereby the relief pressure of the relief valve decreases to a lowest level, wherein said second clutch control means is disposed adjacent said friction clutch means and is supplied with hydraulic pressure oil from said first clutch control means, and said oil pressure adjusting mechanism cancels the hydraulic oil pressure for engaging said friction clutch means in response to a declutching operation of said first clutch control means and returns to an initial state.

2. A propelling drive control apparatus as claimed in claim 1, wherein said friction clutch means comprises a forward drive clutch (FC) and a backward drive clutch (RC) operable for backward and forward drive switching, and said first clutch control means comprises a backward and forward drive switching valve (V1) for selectively engaging said forward drive clutch (FC) and said backward drive clutch (RC).

3. A propelling drive control apparatus as claimed in claim 2, wherein a main change speed device (3) and an auxiliary change speed device (4) are disposed downstream of said forward drive clutch FC and backward drive clutch RC.

4. A propelling drive control apparatus as claimed in claim 1, said oil pressure adjusting mechanism includes means for setting a maximum pressure level of oil supplied to said second clutch control means.

* * * * *